May 26, 1970  M. M. GRAHAM ET AL  3,513,873
UNITARY CONTROL DEVICE

Filed Aug. 2, 1967  2 Sheets-Sheet 1

INVENTORS
MARVIN M. GRAHAM
JOHN W. WRIGHT
BY
Christen, Sabol, O'Brien & Caldwell
ATTORNEYS

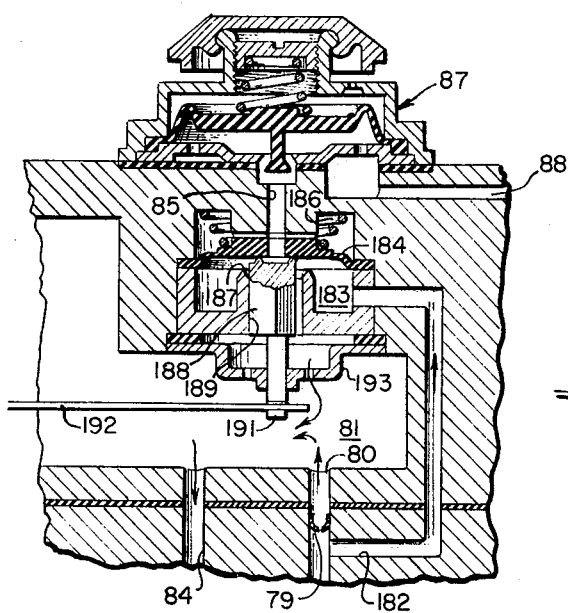
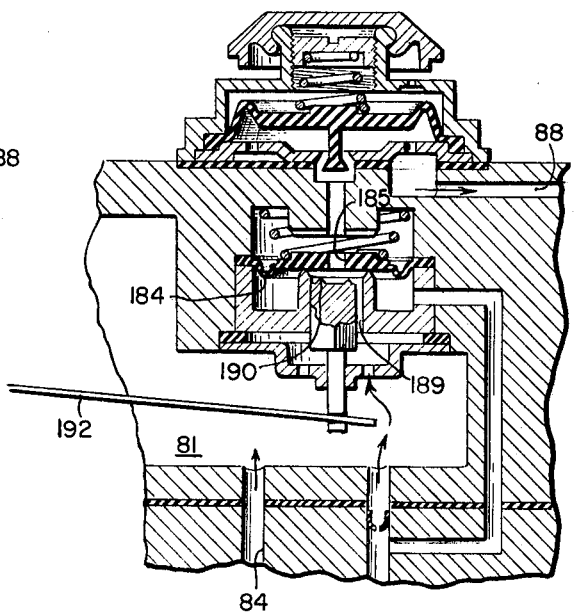
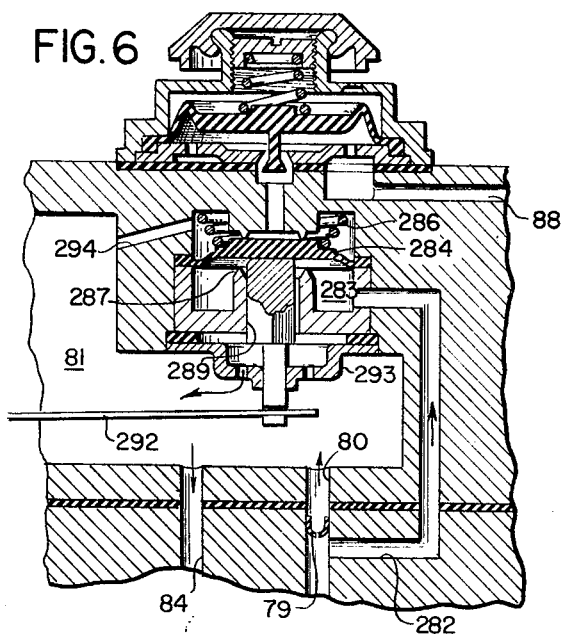
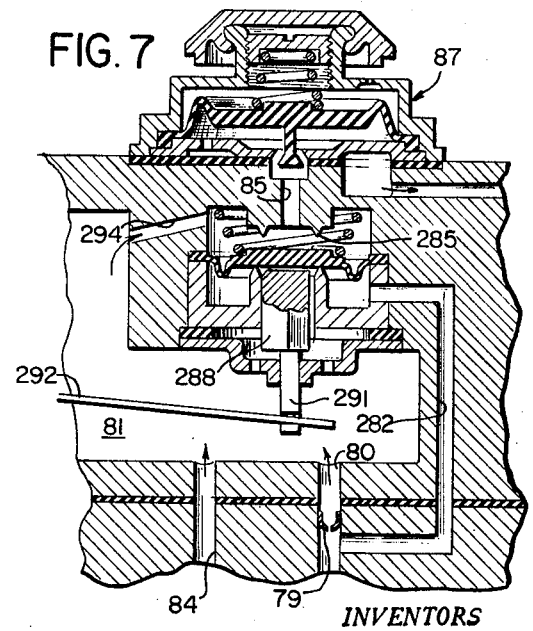

United States Patent Office 3,513,873
Patented May 26, 1970

3,513,873
UNITARY CONTROL DEVICE
Marvin M. Graham, San Pedro, and John W. Wright, Long Beach, Calif., assignors to Robertshaw Controls Company, Richmond, Va., a corporation of Delaware
Filed Aug. 2, 1967, Ser. No. 658,000
Int. Cl. F16k 31/14
U.S. Cl. 137—495                4 Claims

ABSTRACT OF THE DISCLOSURE

An unitary control device for main and pilot burner apparatus having a differential pressure operated diaphragm valve operated by an internal bleed line which is subject to pressure regulation and to on-off control by a dual valve permitting a bypass bleed flow to assure closure of the main diaphragm valve. The control device casing houses conventional manual and safety valves adjacent its inlet port and includes an impurity collector in its inlet chamber as being arranged so that all the connections for operating components of the control device are located on the same wall of the casing.

BACKGROUND OF THE INVENTION

Field of the invention

This invention relates to a flow control system for controlling and regulating the pressure of fuel flows to main and pilot burner apparatus, and in particular to such a system wherein the main flow of fuel is modulated between preselected limits by varying the branched flow of a pilot fuel.

Description of the prior art

The prior art, as exemplified by U.S. Pat. No. 3,227,370 and No. 3,235,180, is cognizant of the general arrangement of a combination control having differential pressure operated diaphragm valve for main flow control and regulation with an internal bleed line for operating the diaphragm valve in response to a thermostatic on-off control and a pressure regulator in the bleed line. The multiplicity of operating components utilized with such combination control devices present a problem in assembly and servicing because the numerous connections for such components are not readily located or easily available to the mechanic or repairman.

SUMMARY OF THE INVENTION

In practicing the present invention, a unitary control device casing houses all the operating components for controlling and regulating the pressure of fuel flow to burner apparatus with all the connections for such components being located on one wall of the casing. Adjacent its inlet port, the casing is provided with a groove that collects impurities from the fuel flow. A main diaphragm valve is operated by a bleed line which includes a bypass bleed flow to assure closure of the main diaphragm valve and a dual on-off control valve for the primary bleed line and the pressure regulator therein.

An object of this invention is to provide a valve body with an impurity collector in its inlet chamber.

The present invention has another object in that a dual valve arrangement increases a bleed flow to effect closure of a main diaphragm valve in a unitary control device.

A further object of the present invention is to facilitate assembly and servicing of the operating components of a combination control device.

Other objects and advantages of the present invention will become apparent from the following description taken in conjunction with the accompanying drawings wherein:

FIG. 4 is a partial section of a modified detail of FIG. 1;

FIG. 5 is a partial section similar to FIG. 4 but showing the components in another operating position;

FIG. 6 is a partial section of another modified detail of FIG. 1; and

FIG. 7 is a partial section similar to FIG. 6 but showing the components in another operating position.

DESCRIPTION OF THE PREFERRED EMBODIMENTS

Figure 1:
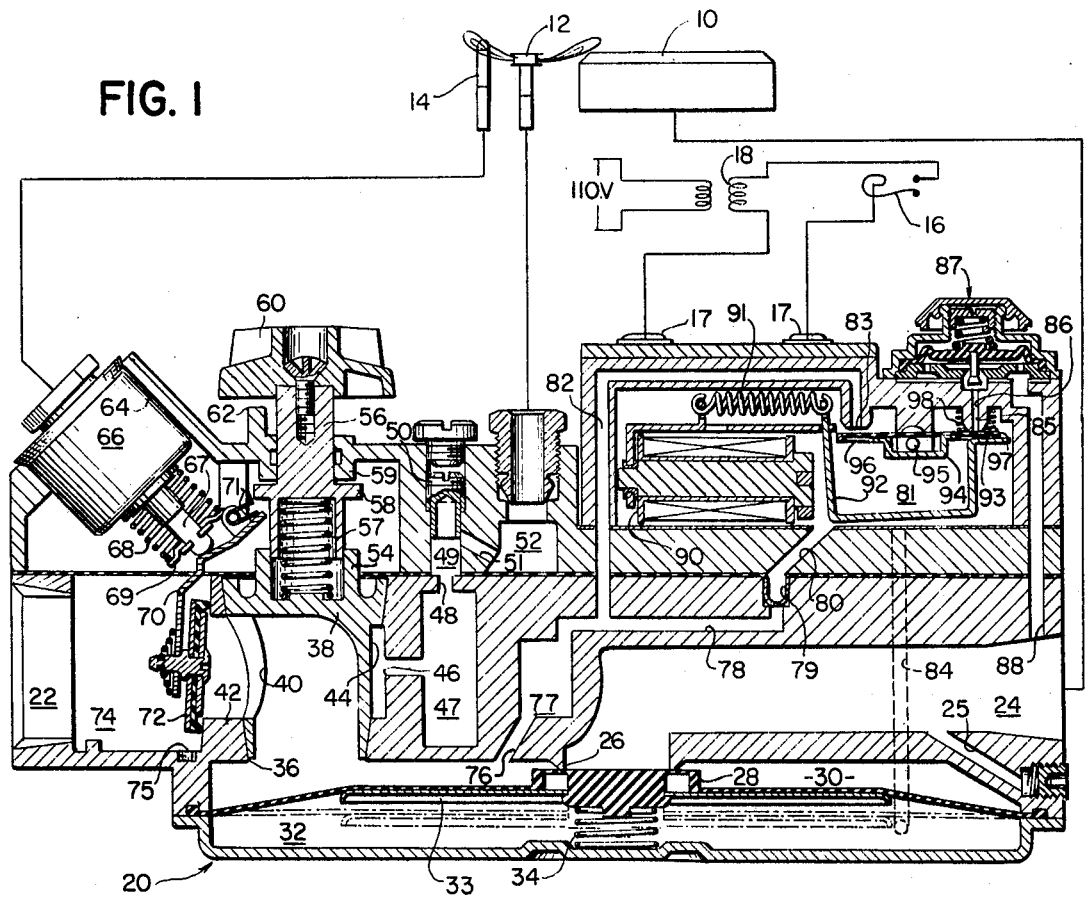
FIG. 1 is a schematic diagram of burner control apparatus embodying the present invention with the control device shown in a schematic sectional view.

While the present invention is applicable to various types of temperature controls for heating and/or cooling apparatus, it will be described in connection with burner apparatus of the heating type. Such apparatus, as shown in FIG. 1, includes a main burner 10, a pilot burner 12 located in igniting proximity to the main burner 10, and a thermocouple 14 disposed in the flame of the pilot burner 12; the main burner 10 is part of a furnace (not shown) supplying heat to a particular area which includes any suitable type of temperature responsive element. In the form illustrated the temperature responsive element is a bimetal switch 16 serially connected to the terminals 17 of an electric actuator and to the secondary winding of a transformer 18, which is connected to any suitable power supply, such as a 110 volt source.

The flows of fuel to the main and pilot burners 10 and 12 are controlled by a combination control device embodied in a hollowed casing indicated generally at 20, having an inlet port 22 on one end connected to a suitable fuel supply such as a gas source (not shown) and a main outlet port 24 on an opposite end connected to the main burner 10 by a suitable conduit. Adjacent the outlet port 24, the casing 20 is provided with a sealed pressure tap connection 25 which may be unsealed and connected to a pressure gage for testing and/or measuring the outlet flow of the fuel; however, the connection 25 is not an operative part of the control apparatus and may be eliminated if so desired. The inlet and outlet ports 22 and 24 are disposed on a common axis with a valve seat 26 intermediately located therebetween. A flow through defining a main valve member 28. The periphery of the the valve seat 26 is controlled by a flexible diaphragm defining a main valve member 28. The periphery of the diaphragm valve 28 is clamped between adjacent sections of the casing 20, which are secured together as by cap screws (not shown). The main diaphragm valve 28 separates a hollow cavity of the casing into an inlet pressure chamber 30 and an operating pressure chamber 32. A back-up plate 33 is secured to the undersurface of diaphragm 28 and a coil spring 34 is mounted in compression between the bottom casing wall of the operating pressure chamber 32 and the back-up plate 33 whereby the diaphragm valve 28 is biased toward engagement with the valve seat 26.

The inlet pressure chamber 30 communicates with the inlet 22 by means of a tapered conical bore 36 which defines a seat for a rotatable plug valve 3 having a similarly tapered conical configuration. The central portion of plug valve 38 is hollowed out and has an open bottom wall communicating with the inlet pressure chamber 30. Intermediate its ends, the tapered wall of plug valve 38 has an inlet bore 40 for registry with an inlet passage 42 in the casing 20. An arcuate groove 44 in the wall of plug valve 38 establishes communication between the inlet passage 42 and a pilot flow passage 46 which leads to pilot flow filter cavity 47 in the casing 20. The filter cavity 47 has an outlet 48 leading to a passage 49 wherein the pilot flow is adjustably set by a screw type sleeve valve 50 for delivery to a passage 51 which leads to a pilot outlet 52 that is connected to the pilot burner 12 by a suitable conduit.

The large end of the plug valve 38 includes a hollow stem 54 in which an operating shaft 56 is keyed for relative axial movement and for unitary rotary movement therebetween. The shaft 56 also has a hollow portion seating a coil spring 57 that is mounted in compression between the stem 54 and shaft 56. An annular shoulder 58 on the shaft 56 engages an internal annular wall 59 in the casing 20 to define the limit of axial movement of the shaft 56 by the coil spring 57; the shaft 56 protrudes through the casing 20 and has a manual operating dial or knob 60 fixed on the end thereof. The undersurface of the dial 60 is partially recessed to receive a stop element 62 on the casing 20 whereby the dial 60 may only be fully depressed when it is in its "pilot" position; when the dial 60 is rotated to its "off" or "on" positions, the stop element 62 prevents full depression of the dial 60 for a purpose to be described more fully hereinafter.

Adjacent the manual dial 60, the casing 20 is apertured at 64 in which a magnet housing 66 is fixedly supported. As is well known in the art, a thermoelectric magnet in the housing 66 is electrically connected to the thermocouple 14 to constitute a safety holding device; i.e., the thermoelectric voltage generated by the thermocouple 14 in response to a flame at the pilot burner 12, is not sufficient to attract the armature 67 against the bias of its coil spring 68 but it is sufficient to hold the armature against the magnet. The coil spring 68 surrounds the protruding portion of the armature 67 and is mounted in compression between a wall of the housing 66 and a retainer washer 69 secured to the free end of armature 67. An intermediate portion of a lever 70 is engageable by the free end of armature 67; a mounting ear adjacent one end of lever 70 is pivoted to a projection of an internal wall of casing 20 with a torsion spring 71 biasing the lever 70 to its valve open position when the magnet 66 is energized. Adjacent the spring 71, the free end of lever 70 is disposed in the path of axial movement of the annular shoulder 58 on the shaft 56 whereby depression thereof by the dial 60 causes the lever 70 to pivot clockwise about its pivotal axis. The opposite end of lever 70 carries a safety valve member 72 which seats against the wall surrounding the inlet passage 42.

Figure 2:
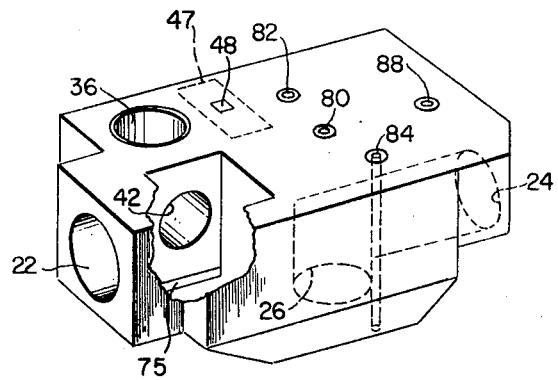
FIG. 2 is a top perspective view of a detail shown schematically in FIG. 1.

Between the inlet port 22 and the inlet passage 42, the casing 20 is hollowed out to define an inlet chamber 74 that houses the electromagnetic safety device including elements 66 through 72. Adjacent the inlet passage 42, the bottom wall of inlet chamber 74 is recessed to form a groove 75 having a length greater than the diameter or size of the opening 42. The groove 75 acts as a impurity catcher whereby dirt, dust, scale, etc. that may be entrained in the incoming gas flow, will settle in the collector groove 75 and will not enter the valve body to interfere with any of the valve closures therein. Even though the inlet port 22 may be provided with a filter screen, the inlet pressure of the gas is such that some impurities are carried through the filter screen; of course, it is not feasible to reduce the inlet pressure because such pressure is predesigned to accommodate a particular B.t.u. input at the main burner 10, As is shown in FIG. 2, the inlet port is transverse to the inlet passage 42 so that incoming gas impinges on a wall of the inlet chamber 74 and the flow path has a change of direction before entering the inlet passage 42. Such impingement will further enhance sedimentation of impurities and facilitate movement and settling of impure particles into the filtering groove 75. It should also be noted that the filtering groove 75 is located directly below the inlet passage 42, i.e., adjacent the outlet for the inlet chamber 74 so as to be in the most efficient position in acting as an impurity collector for the entire inlet chamber 74. In addition, the impurity collector groove 75 is so located as to permit easy cleaning with access thereto being had through the inlet port 22 and/or through the opening 64 upon removal of the magnet housing 66.

Downstream of the manual plug valve 38 and upstream of the main valve seat 26, the casing 20 has a bleed line conduit 76 leading from the inlet pressure chamber 30 to a bleed line filter cavity 77 which communicates with a pair of branch bleed lines. The first branch bleed line includes a bleed passage 78, a flow restrictor 79 and a bleed passage 80 communicating with a valve chamber 81. The second branch bleed line has a bleed passage 82 terminating in an inlet valve seat 83 that communicates with the valve chamber 81. An open bleed line passage 84 from the valve chamber 81 extends to the underside of the main diaphragm 8 into communication with the operating pressure chamber 32.

A controlled bleed line passage from the bleed valve chamber 81 includes an outlet valve seat 85, a bleed passage 86, a bleed line pressure regulator 87, and an bleed passage 88 establishing communication between the outlet side of the regulator 87 and the main outlet port 24. The pressure regulator may be of any conventional type such as is best illustrated in the larger view of FIG. 4 and includes a regulating valve regulating the bleed line flow from passage 86 into a regulating chamber which communicates with the bleed line outlet passage 88. A movable wall of the regulating chamber is defined by a flexible diaphragm having one side attached to the regulating valve and its opposite side being subject to atmospheric pressure by a suitable vent in the regulating housing. A coil spring biases such opposite side of the flexible diaphragm and the biasing force is adjustable by a set screw upon removal of a snap-off cover member on the top of the regulator housing.

For control of the two valve seats 83 and 85, the bleed valve chamber 81 houses actuating mechanism which may be of any suitable type such as an hydraulic actuator, an electrical actuator, etc. In the form illustrated in FIG. 1, an electrical actuator is utilized and includes an electromagnetic device 90 having a core fixedly supported to a casing wall in the chamber 81 and an electrical coil wound thereon and electrically connected by lead wires (not shown) to the terminal posts 17 for connection in the space thermostat circuit. The supporting frame for the electromagnetic device 90 has an attaching ear for a coil spring 91 and a fulcrum for a generally U-shaped armature 92; the coil spring 91 is mounted in tension between such attaching ear and one end of the armature 92. The opposite end of armature 92 has a flange 93 defining an operative connection for a dual valve plate 94. The valve plate 94 is pivoted intermediate its ends to a pivot pin 95 carried by the casing wall between the bleed valve seats 83 and 85. The top of valve plate 94 is covered with resilient material so that one end defines a valve member 96 cooperating with the bleed inlet valve seat 83 and the opposite end defines a valve member 97 cooperating with the bleed outlet valve seat 85. A coil spring 98 is mounted in compression between an internal casing wall and the valve member 97 to bias the valve plate 94 clockwise about its pivot 95.

Figure 3:
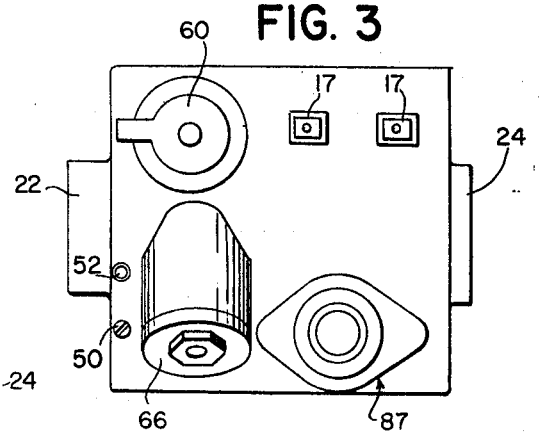
FIG. 3 is a broken top plan view of the control device shown schematically in FIG. 1.

The casing 20 and its components are shown schematically arranged in FIG. 1 in order to facilitate their descriptions and to illustrate in a clear manner the external connections for the components. The valve casing 20 may be integrally cast or molded but ease of assembly is enhanced by utilizing separate casing sections having suitable gaskets therebetween and secured together as an integral unit by suitable fastening means such as cap screws (not shown). However, whether the casing 20 is integrally cast or formed from a plurality of mating sections, the arrangement described above possesses the particular advantage that the connections for all the operating components are located on the top wall of the casing 20. For instance, the thermocouple cable connector for the safety holding magnet 66, the manual operating dial 60, the pilot flow adjustment means 50, the pilot flow outlet 52, the terminal posts 17, and the pressure regulator 87 are all located on the top of the casing 20 as shown in FIGS. 1 and 3. This arrangement has a particular advantage in that once the casing 10 is operatively connected in the system, all the connections for the operating components are disposed on one wall of such casing. Thus, the installation mechanic and/or the serviceman is not confronted with the problems of locating the various connections and then making such connections in an area that is necessarily confined because the casing 10 is located as close to the heating appliance as is possible. Even after the casing 20 has been installed, it may be necessary for a repairman to replace one of the operating components, such as the thermocouple cable connector to magnet 66, or to adjust the pilot flow restrictor 50 or the pressure regulator 87, in which event, such replacement and/or adjustments are easily accomplished since their connections are all located on the same wall of the casing 10. While the description and drawing refer to the top wall as being the one which defines the locations of such connections, other walls of casing 20 may be used; it is only necessary that all the connections for the operating components be located on one and the same wall.

In the following description of a sequence of operation of the control apparatus, it should be noted that the flame shown at pilot burner 12 is merely to illustrate its relationship to the main burner 10 and the thermocouple 14. Thus in FIG. 1, the plug valve dial 60 is in its "on" position but for some reason the pilot burner flame was extinguished causing deenergization of the holding magnet 66 and closure of the safety valve 72 to define a 100% shut-off condition of all fuel flow through the casing 20. In order to commence operation of the system, the plug valve dial 60 is first rotated to its "pilot" position wherein the plug valve inlet 40 is out of registry with the inlet passage but the pilot flow groove 44 establishes communication between the inlet passage 42 and the pilot flow passage 46. When in its "pilot" position, the plug valve dial 60 may be depressed because its partial recess is aligned with the stop element 62. Upon axial depression of the plug valve dial 60 and its shaft 56 against the bias of coil spring 57, the reset shoulder 58 engages the free end of lever 70 and pivots the same clockwise as viewed in FIG. 1; this clockwise movement causes lever 70 to move armature 67 against the pole faces of the holding magnet 66 and simultaneously moves the safety valve 72 to an open position. A pilot flow of fuel now proceeds from the inlet chamber 74 through the inlet passage 42, the plug valve groove 44, the pilot flow passage 46, the filter cavity 47, the cavity outlet 48, the passage 49, the sleeve valve 50, the passage 51 and the pilot flow outlet 52 to the pilot burner 12 where it is ignited by any suitable means, such as a match.

As soon as the thermocouple 14 generates sufficient voltage to energize the holding magnet 66, the plug valve dial 60 may be released whereupon it will axially return to normal axial position. The corresponding upward movement of the reset shoulder 58 is not followed by the free end of lever 70 because the torsion spring 71 retains the lever 70 and safety valve 72 in an open position relative to the inlet passage 42.

The plug valve dial 60 is now rotated to its "on" position wherein the plug valve inlet 40 is in registry with the inlet passage 42. During each rotation, the plug valve groove 44 maintains registry with the inlet passage 42 because its arcuate length is sufficient to provide an overlap for movement between "pilot" and "on" positions of the plug valve 38; thus the flame at the pilot burner 12 continues since there is no interruption of the pilot flow of fuel. As is shown in FIG. 1, the "on" position of the plug valve 38 permits a main flow of fuel to the inlet pressure chamber 30.

A bleed flow proceeds from the inlet pressure chamber 30 through the bleed line conduit 76, the bleed line filter cavity 77 and both branch bleed lines 78–79–80 and 82–83 into the bleed valve chamber 81, thence through the always opened bleed line passage 84 to the operating pressure chamber 32. With such an arrangement the inlet pressure chamber 30 and the operating pressure chamber are subject to inlet pressure and there is no pressure differential between opposite sides of the main diaphragm valve 28 which is accordingly biased to its closed position on the main valve seat 26 by the coil spring 34. Closure of the main valve seat 26 prevents any flow to the main burner 10 so it is apparent that the space thermostat 16 is in a satisfied or opened condition as shown in FIG. 1.

When the space thermostat 16 becomes unsatisfied or closes, the energizing circuit for the electromagnet 90 is completed whereby the armature 92 is pivoted clockwise (as viewed in FIG. 1) against the bias of tension spring 91. The armature flange 93 then releases the adjacent end of the valve plate 94 which is pivoted clockwise about the pin 95 by the action of the coil spring 98 whereupon the bleed line valve seat 83 is closed and valve seat 85 is opened. Closure of the valve seat 83 cuts off the unrestricted bleed flow from the bleed passage 82 into the bleed valve chamber 81 but the restricted bleed flow from the bleed passage 80 is permitted. With the valve seat 85 opened, the bleed valve chamber 81 is vented to the outlet 24 in a path traced through the bleed passage 86, the bleed line pressure regulation 87 and the outlet bleed passage 88; at the same time the operating pressure chamber 32 is depressurized by being bled to the lower pressure chamber 81 since the bleed line passage 84 is always in communication with the bleed valve chamber 81. Depressurization of the operating pressure chamber 32 causes the main diaphragm valve 32 to move to an open position because the pressure differential on the top side thereof from the higher pressure of the inlet pressure chamber 30. The main diaphragm valve 28 now assumes its regulating position to regulate the pressure of the fluid flow to the main burner 10. The setting of the bleed line pressure regulator 87 defines the rate of flow to the bleed line outlet sensing port 88, so that the regulating position of the main diaphragm valve 28 may also be adjusted by adjusting the bleed line regulator 87.

The above arrangement assures minimum pressure deviation at outlet 24 under variations in inlet pressure and throughput so that straight line pressure regulation is obtained through the response of the main valve 28 to the small sensing regulator 87 in the internal bleed line.

When the temperature requirements of the space being temperature controlled are satisfied, the space thermostat 16 opens the energizing circuit for the electromagnet 90 causing the armature lever 92 and valve plate 94 to pivot counterclockwise (as view in FIG. 1) whereby the bleed valve seat 85 is closed and the bleed valve seat 83 is opened. At this time, there is no bleed flow out of the bleed valve chamber 81 and the bleed flows from both the restricted passage 80 and the unrestricted or bypass passage 82 into the bleed valve chamber 81 proceed through the bleed passage 84 into the operating pressure chamber 32 which is again pressurized causing closure of the main diaphragm valve 28 so there is no fuel flow to the main burner 10. This arrangement has the particular advantage of insuring the off position of the main valve 28 because of the opened unrestricted bleed passage 82. Even if the orifice 79 should not function properly, as by being clogged in spite of the many filtering devices upstream thereof, the bypass bleed passage 82 will provide the necessary bleed flow to pressurize the operating pressure chamber 32. In addition to providing positive main valve closure independently of the bleed line restricting orifice 79, the unrestricted bleed line passage 82 assures that such closure will be at a rapid rate. Since the bleed valve members 96 and 97 are located on the same valve plate 94, simultaneous actuation occurs so that closure of the outlet bleed passage 86 results from deenergization of the electromagnet 90.

The main burner 10 will be cycled thermostatically in accordance with the temperature demand sensed by the thermal sensor 16. In the event the flame at the pilot burner 12 should be extinguished for any reason, the thermocouple 14 will cool and the electromagnetic coil of the holding device 66 will be deenergized causing release of the armature 67. Because the coil spring 68 exerts a greater force than the torsion spring 71, the armature 67 will cause counterclockwise movement of the lever 70 and closure of the safety valve 72, which results in the cut off of all fuel flow to the main and pilot burners 10 and 12. To reestablish the flame at the pilot burner 12, the igniting procedure outlined above must be repeated, i.e., the dial 60 must be rotated to its "pilot" position before it can be depressed to a reset position.

In the following description of the two modifications of the bleed line controls, the same reference numerals are utilized for those parts already described in connection with FIGS. 1–3 while new reference numerals in the 100 series are utilized for FIGS. 4 and 5, and new reference numerals in the 200 series are utilized for FIGS. 6 and 7. Accordingly, in FIGS. 4 and 5, the unrestricted bleed passage 182 leads into an annular passage 183 one wall of which is defined by a flexible diaphragm 184 having a central port 185. A compression coil spring 186 on one side of the diaphragm 184 biases the same toward a fixed annular valve seat 187. A poppet valve member 188 reciprocates through a cylindrical bore 189 having the annular valve seat 187 on one end; the poppet valve 188 is of non-circular cross section so that a bleed flow is permitted between the poppet valve 188 and the cylindrical bore 189. One end of the poppet valve 188 has an annular valve seat 190 which is of a larger diameter than the central port 185 to cut off bleed flow thereto. The other end of poppet valve 188 has a valve stem 191 coupled to the actuated arm 192 of any suitable type of bleed line operators. The valve stem 191 reciprocally extends through a guide plate 193 having a plurality of bleed flow apertures to establish communication between the bleed valve chamber 81 and the cylindrical bore 189.

The operation of the bleed line valves in the modification of FIGS. 4 and 5 accomplishes the same results as described above in connection with FIG. 1 and will not be repeated for the sake of brevity. The center ported type of bleed line control has the particular advantage that one valve member must close before the other opens; this is desirable with relatively slow operation mechanisms such as heat motor bimetal operators.

FIG. 4 represents the "off" condition of the main burner 10 inasmuch as the actuated arm 192 is in its deenergized position. The unrestricted bleed flow is thus traced from the passage 182 through the passage 183, the valve seat 187, the cylindrical bore 189 and the apertured guide plate 193 into the bleed valve chamber 81, whence the operating pressure chamber 32 is pressurized. When the actuated arm 192 is energized, it pulls the poppet valve member 188 downward as viewed in FIG. 5 whereby the unrestricted bleed flow is cut off and the bleed valve chamber 81 is bled through the apertured guide plate 193, the cylindrical bore 189, the opened diaphragm port 185, the bleed passage 85 and the regulator 87 to the bleed outlet passage 88.

In the modification of FIGS. 6 and 7, the unrestricted bleed passage 282 leads into an annular passage 283, one wall of which is defined by a flexible diaphragm 284. One side of the diaphragm 284 cooperates with a valve seat 285 leading to the bleed passage 85 and is biased therefrom by a compression coil spring 286; the other side of diaphragm 284 is thus biased toward a fixed annular valve seat 287. A non-circular poppet member 288 reciprocates through a cylindrical bore 289 having the annular valve seat 287 on one end; the other end of the poppet 288 has a stem 291 coupled to the actuated arm 292 of any suitable type of bleed line operators. The stem 291 reciprocally extends through a guide plate 293 having a plurality of apertures to establish communication between the bleed valve chamber 81 and the cylindrical bore 289. A passage 294 from the bleed valve chamber 81 to the top side of diaphragm 284 permits the bleeding of the chamber 81 when the actuator arm 292 is energized as is illustrated in FIG. 7. The remaining elements in FIGS. 6 and 7 function in the same manner as FIGS. 4 and 5 so their operation will not be repeated for the sake of brevity.

Inasmuch as the present invention is subject to many modifications, variations and changes in detail, it is intended that all matter contained in the foregoing description of the preferred embodiments or shown on the accompanying drawings shall be interpreted as illustrative and not in a limiting sense.

What is claimed is:

1. In a combination control device, the combination comprising
   a casing having inlet means adapted for connection to a fuel source, main outlet means adapted for connection to a main burner and pilot outlet means adapted for connection to a pilot burner,
   differential pressure operated main valve means for controlling a fuel flow to said outlet means,
   bleed line means in said casing for effecting operation of said main valve means,
   a plurality of operating components in said casing including safety valve means, manual valve means, pilot flow adjustment means, automatically operated actuator means for controlling said bleed line means, and pressure regulating means for regulating said bleed line means, and
   external connection means for each of said operating components adapted for assembly into an unitary system,
   all of said external connections and said pilot outlet means being located on a single wall of said casing.

2. The invention as recited in claim 1 wherein said inlet means and said main outlet means are located on walls of said casing different from the said single wall.

3. The invention as recited in claim 1 wherein said inlet means and said main outlet means are located on separate walls of said casing and the said single wall is joined to said separate walls.

4. The invention as recited in claim 3 wherein said separate walls of said casing are opposite each other and the said single wall extends therebetween.

References Cited

UNITED STATES PATENTS

| | | | |
|---|---|---|---|
| 1,181,435 | 9/1916 | Cartwright | 137—546 XR |
| 1,403,396 | 1/1922 | Erickson | 137—614.17 |
| 2,746,471 | 5/1956 | Cobb | 137—495 XR |
| 2,899,972 | 8/1959 | Matthews | 137—495 |
| 2,977,966 | 4/1961 | Matthews | 137—495 XR |
| 3,186,470 | 6/1965 | Korte | 137—468 XR |
| 3,227,370 | 1/1966 | Houser | 236—48 |
| 3,235,180 | 2/1966 | Graham et al. | 236—80 |
| 3,351,085 | 11/1967 | Allingham | 137—495 |
| 3,354,901 | 11/1967 | Dietiker et al. | 137—495 |

M. CARY NELSON, Primary Examiner

R. J. MILLER, Assistant Examiner

U.S. Cl. X.R.

137—613